United States Patent
Rogasch

(10) Patent No.: US 7,848,366 B2
(45) Date of Patent: Dec. 7, 2010

(54) DATA-TRANSMISSION DEVICE AND METHOD FOR TRANSMITTING DATA WITH A REDUCED OUTAGE RISK

(75) Inventor: Volker Rogasch, Greifswald (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 792 days.

(21) Appl. No.: 11/628,903

(22) PCT Filed: Jun. 4, 2005

(86) PCT No.: PCT/EP2005/006024

§ 371 (c)(1),
(2), (4) Date: Dec. 8, 2006

(87) PCT Pub. No.: WO2005/122597

PCT Pub. Date: Dec. 22, 2005

(65) Prior Publication Data

US 2008/0291907 A1 Nov. 27, 2008

(30) Foreign Application Priority Data

Jun. 14, 2004 (DE) .................. 10 2004 028 388

(51) Int. Cl.
*H04J 3/04* (2006.01)
*H04L 12/66* (2006.01)
*H04L 12/28* (2006.01)
*H04L 12/26* (2006.01)

(52) U.S. Cl. .............. 370/535; 370/419; 370/252; 370/463

(58) Field of Classification Search ......... 370/357–369, 370/39.64, 395.65, 535, 419, 252, 463; 709/311–313; 714/27
See application file for complete search history.

(56) References Cited

U.S. PATENT DOCUMENTS 4,771,418 A * 9/1988 Narasimhan et al. ........ 370/359

(Continued)

FOREIGN PATENT DOCUMENTS

CN 1482769 A 3/2004

(Continued)

OTHER PUBLICATIONS

Derwent Abstract—EP-1 133 197 A1; Sep. 12, 2001; Tenovis GmbH & Co. KG, D-60362 Frankfurt am Main, Germany.

*Primary Examiner*—John Pezzlo
*Assistant Examiner*—Saad Hassan
(74) *Attorney, Agent, or Firm*—Laurence A. Greenberg; Werner H. Stemer; Ralph E. Locher

(57) ABSTRACT

A data-transmission device has a number of N uplink interfaces routable to an output element over a processing line provided with data-processing components. A first processing line and a second processing line are provided each having two separate processing rows for in each case N/2 data lines. Each processing line has a circuit arrangement by means of which the N/2 data lines connected to the processing line can be connected to the respective other processing line to one of the two processing rows available there. The circuit arrangements is controlled in such a way that one of the two processing lines is active and the respective other can be switched to a standby mode so that the data traffic waiting at the N uplink interfaces can be handled via one of the two processing lines.

9 Claims, 5 Drawing Sheets

U.S. PATENT DOCUMENTS

| | | |
|---|---|---|
| 6,728,780 B1 | 4/2004 | Hebert |
| 7,333,426 B1 * | 2/2008 | Hill et al. .................... 370/219 |
| 2003/0119555 A1 | 6/2003 | Friesen et al. |
| 2004/0054793 A1 * | 3/2004 | Coleman .................... 709/229 |
| 2004/0133634 A1 * | 7/2004 | Luke et al. ................. 709/203 |
| 2004/0218590 A1 * | 11/2004 | Clark et al. ................. 370/357 |
| 2004/0236867 A1 * | 11/2004 | Lanus et al. ................ 709/238 |

FOREIGN PATENT DOCUMENTS

| | | |
|---|---|---|
| EP | 1 133 197 | 9/2001 |

\* cited by examiner

DATA-TRANSMISSION DEVICE AND METHOD FOR TRANSMITTING DATA WITH A REDUCED OUTAGE RISK

BACKGROUND OF THE INVENTION

The invention relates to a data-transmission device having a number of N uplink interfaces routable to an output element over a processing line provided with data-processing components. The invention relates further to a method for transmitting data traffic that is routed from a number of N uplink interfaces to an output element over a processing line provided with data-processing components.

For communication equipment, such as, for instance, telecommunication networks for voice and/or data traffic, stringent demands are in most applications placed on availability in order to safeguard basic provisioning with telecommunication services. It is therein generally required for components whose outage will adversely affect a certain number of users to be implemented redundantly. Examples of components of said type therein include individual modules and internal and external interfaces. An outage of up to 64 users due to an individual fault is generally accepted in many applications (in keeping with GR-303). For the system design of communication equipment this means that in particular central modules whose function must be available for a large number of users have to be implemented redundantly, including their external and internal interfaces. Central modules are for that reason as a rule implemented in pairs, with one module being active and the other redundant module operating in a standby mode. The modules comprising said redundant pair are therein as a rule implemented identically.

A further boundary condition is the requirement to achieve a high degree of flexibility in terms of the type of module for communication equipment, in particular in what are termed access applications. A device of said type is accommodated to the respective application through the choice of interfaces, with a degree of flexibility being required in terms of equipping and/or connectivity. According to the prevailing state of the art, front access or rear access is therefore often chosen for the connection modes in the case of said modules.

The uplink interfaces (direction of data from the user to the switching center) employed in the access domain consist in many data-transmission applications of individual interfaces routed in parallel. Thus, for example, the voice interface conforming to the V5.2 standard consists of up to 16×E1 lines (ETSI applications) and the GR-303 interface of up to 28×DS1 lines (ANSI applications). The actually quite obvious solution of implementing said interfaces redundantly is for cost reasons often unacceptable, even for a network operator.

A technical problem arises when the user lines of interfaces of said type are connected to a single module because there will then be what is termed a single point of failure at that connection point. The failure of said module will, though, cause a usually unacceptable disruption to a large number of users. That problem has to date not been satisfactorily resolved by the known solutions described below.

One of said currently unsatisfactory solutions provides for an arrangement of plug-in connectors, in particular for user lines subject to extra stringent reliability requirements, directly on the module shelf, independently of the individual modules. Special mechanical solutions for module shelves having integrated plug-in connectors are required for solutions of said type. What is disadvantageous therein is that an increased expenditure will be incurred for the mechanical components and backplane of the module shelf, notwithstanding which total reliability can still, though, not be insured. Moreover, the flexibility of an arrangement of said type is only slight, giving rise to additional costs. And, finally, the plug-in connectors themselves of course constitute a single point of failure.

A further solution in this regard provides for separate user lines to the active and to the non-active module. In the event of a fault on the active module, an external changeover switch will be put into action that then changes over from the active module to the hitherto inactive module, which will continue being the active module. As the external changeover switch it is therein possible to employ a series-connected cross-connect multiplexer having E1/DS1 interfaces, although that will itself in turn disadvantageously constitute a single point of failure and exhibit relatively long changeover times.

The changeover switch could, alternatively, also be integrated in the device, with said switch then being arranged on a separate module (exhibiting a high degree of reliability). However, this solution also fails to eliminate the problem of there being a single point of failure; moreover, additional expenditure will be incurred owing to the additional central board.

That can be remedied by a solution exhibiting what is termed load sharing, wherein provision is made for dividing the user lines between two modules and operating both modules in parallel, with each module being operated with a reduced load. This solution is, though, also disadvantageous in that performance will be greatly reduced following the outage of one module and a high software expenditure will be required for administering load sharing.

SUMMARY OF THE INVENTION

The object of the invention is thus to provide a data-transmission device and a method for transmitting data by means of both of which a high level of availability will be insured for the interconnecting of user lines at a relatively low cost in terms of administering and equipping.

Said object is inventively achieved in terms of the data-transmission device of the type cited in the introduction by providing a data-transmission device having a number of N uplink interfaces routable to an output element over a processing line provided with data-processing components, in the case of which device a first processing line and a second processing line are provided each having two separate processing rows for in each case N/2 data lines, with a first half of the N uplink interfaces being connected to the first processing line and the second half of the N uplink interfaces being connected to the second processing line, and with each processing line having a circuit arrangement by means of which the N/2 data lines connected to the processing line can be connected to the respective other processing line to one of the two processing rows available there, and with the circuit arrangements being controlled in such a way that one of the two processing lines is active and the respective other can be switched to a standby mode so that the data traffic waiting at the N uplink interfaces can be handled via one of the two processing lines.

In terms of the method for transmitting data, said object is inventively achieved by providing a method for transmitting data traffic that is routed from a number of N uplink interfaces to an output element over a processing line provided with data-processing components, in the case of which method a first processing line and a second processing line are used each having two separate processing rows for in each case N/2 data lines, with a first half of the N uplink interfaces being connected to the first processing line and the second half of the N uplink interfaces being connected to the second processing line, and with the N/2 data lines connected to the processing line being connected by means of a circuit arrangement provided for each processing line to the respective other processing line to one of the two processing rows available there, and with the circuit arrangements being controlled in such a way that one of the two processing lines is active and the respective other has been switched to a standby mode so that the data traffic waiting at the N uplink interfaces will be handled via one of the two processing lines.

The uplink data lines are in this way connected to two modules in a distributed manner, though with the physical logical processing of all uplink data lines taking place on one of the two-modules (processing line). The technical means for further connecting in each case N/2 data lines can therein be implemented relatively simply and with a high degree of availability, as well as in a way largely isolated from the main function of the processing line, which is to say the module, for example. Both processing lines can furthermore operate very largely independently so that any disruptions to the modules' main function will not perforce affect the further connecting of the data lines. Only the components relevant to further connecting the uplink data lines, not the entire module, need be considered for the statements on reliability. Should a processing line fail, there will hence then be no limitations on performance as all processing takes place on a redundant processing line designed for all uplink data lines. For this reason it is also possible to dispense with the aforementioned software structures of the kind required for implementing load sharing.

In an advantageous embodiment of the invention it will then be possible, for example, to give the E1/DS1 user lines 1 to N of a voice-data interface V5.2/GR303 a definitive assignment when the interface is set up. Control information will then, for instance, be transmitted on specific channels, with a relevant assignment not, for that very reason, having to be changed when a module is changed over from the active to the inactive condition, and vice versa. Line crossover, as is provided by the possibility of further connecting the E1/DS1 user lines, is for this purpose canceled as a function of the mounting location by means of a static multiplexer. A multiplexer of said type can then be arranged between the uplink interface and the actual processing row with its processing components.

Further advantageous embodiments of the invention can be found in the other subclaims.

BRIEF DESCRIPTION OF THE SEVERAL VIEWS OF THE DRAWINGS

Exemplary embodiments of the invention are explained below with the aid of the drawing.

DETAILED DESCRIPTION OF THE INVENTION

Figure 1:
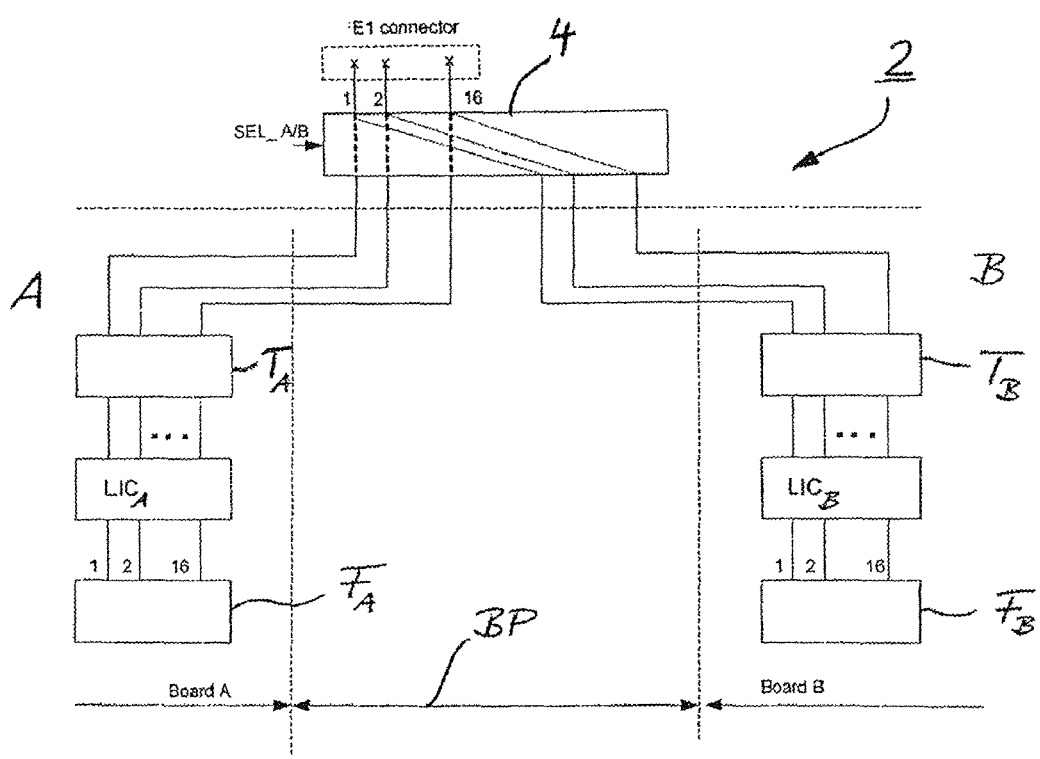
FIG. 1 shows a processing device having redundancy changeover on a separate board according to the prior art.

FIG. 1 is a schematic of a processing device 2 according to the prior art wherein lines 1 to N=16 of an E1/DS1 interface, here labeled as an E1 connector, are connected to a controlled changeover switch 4. Said lines are switched to an active module B as a function of a control signal SEL_A/B. By means of the dashed lines in the changeover switch 4 it is indicated in this exemplary embodiment that the module A has been switched to the inactive condition. The changeover switch 4 can be implemented using relays. All further functions are performed on the active module B, which for this purpose has a transformer $T_B$, a line module $LIC_B$ (LIC=Line Interface Circuit), and, as an output element, a framer $F_B$. The changeover switch 4 thus in this embodiment constitutes a single point of failure, which, according to the object of the invention, is to be avoided.

Figure 2:
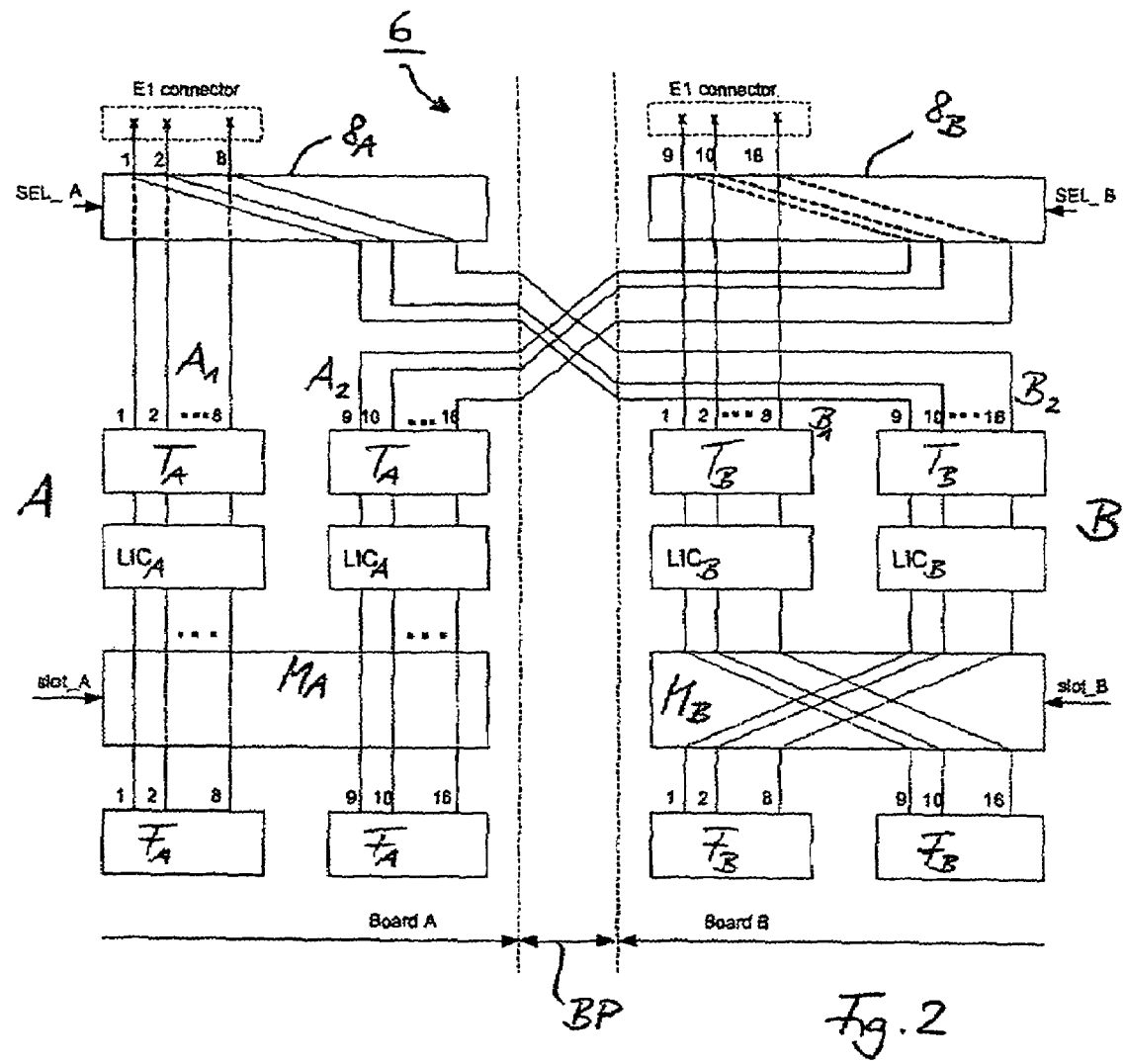
FIG. 2 shows a first inventive processing device with changing over of the E1 interfaces by means of relays.

FIG. 2 is a schematic of a first processing device 6 according to the present invention. Two processing lines A, B are each arranged identically structured on a separate module. One module, in this case the board B, is operating in the active condition; the other board A is in an inactive condition, for example a standby condition. Only N/2—so in this case eight—E1 lines of a V5.2 interface are connected to each board A, B. A changeover switch 8a or, as the case may be, 8b, based likewise on relays, is controlled by the "Active/Not Active" condition of the associated board A, B and will, if the associated board is in the "Active" condition, cause the E1 lines to be further connected to the receive circuit (processing row) of their own board. If, though, the relevant board is in the "Inactive" condition, then the N/2 E1 lines will be further connected to the adjacent active board via a backplane BP of their module shelf (not shown in further detail here), such as, for example, a switch cabinet. What can be achieved by means of suitably configured relay changeover switches 8a, 8b is that if one board suffers a power outage the E1 lines connected there will be switched to the adjacent module. Actual signal processing conforming to the G.703 ITU standard takes place in the processing row implemented as the receive circuit containing the transformer T and the line module LIC. In this exemplary embodiment the inactive board's receive circuit will then remain unused. An in each case downstream multiplexer M is controlled by a signal slot_A, slot_B derived statically from the corresponding active board's mounting location. The internal terminations of the line modules-LIC are switched either directly or crossed over to the downstream framers F, in which signal processing takes place according to the G.704 ITU standard.

In a preferred embodiment, for example, the multiplexer M is implemented as part of an FPGA (Freely Programmable Gate Array), as a result of which a relatively economical solution can be achieved. It is insured through said arrangement that the assignment of the E1 lines 1 to N, in this case N=16, of the V5.2 interface at the inputs of the framers F will be retained regardless of either board's condition.

Figure 3:
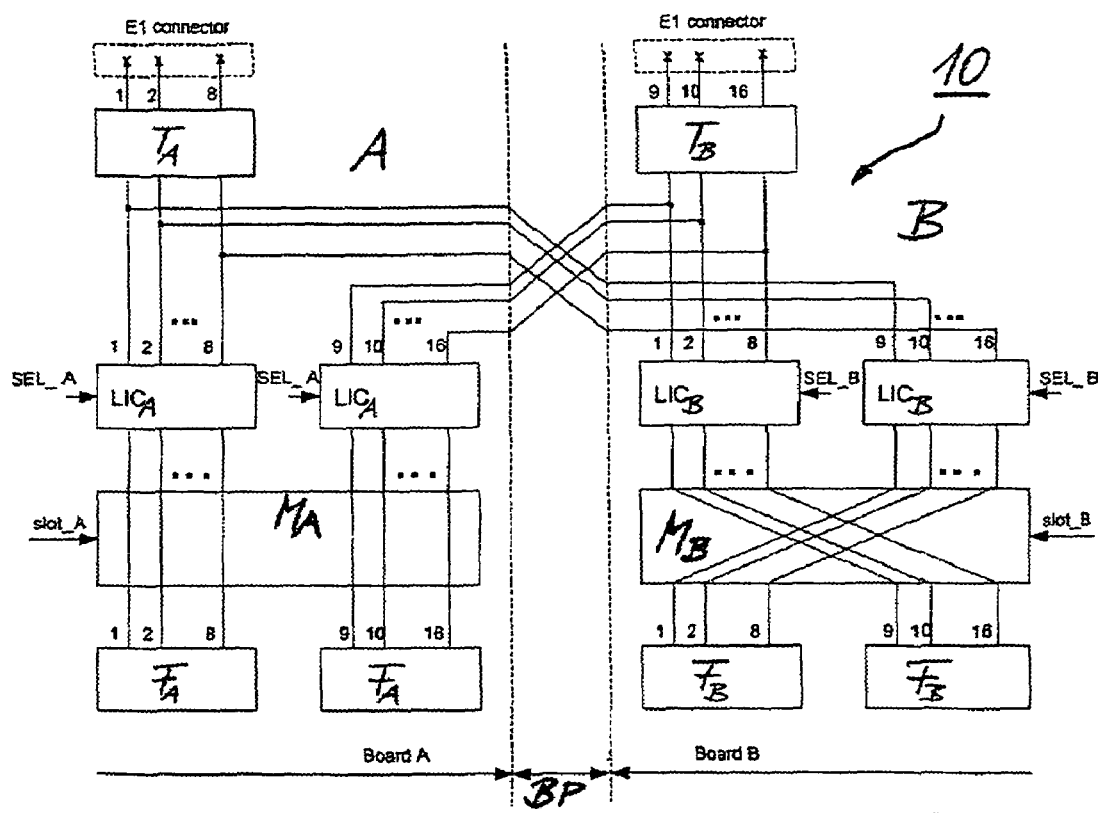
FIG. 3 shows a second inventive processing device with changing over of the E1 interfaces by means of tri-state conditions at the LIC output.

FIG. 3 is a schematic of a second data-transmission device 10 wherein the changeover switches 8a, 8b provided in FIG. 2 have been replaced by means for controlling the outputs of the line module LIC (what are termed tri-state outputs). The E1 lines are divided in the manner indicated for the preceding first data-transmission device 6. At the E1/DS1 interface the required transformers T have been assigned directly to the plug-in connectors of the E1 lines. The transformers T are connected at their internal interface to the line modules LIC of the two modules A and B, with the connection to the respectively adjacent module being via the backplane BP. The line modules LIC on the active module can be activated by means of a control signal SEL_A, SEL_B; the inactive module's line modules LIC are accordingly in the tri-state condition and hence ineffective for the signal path. In said transmission device 10 also, the function of the multiplexer M corresponds to that of the exemplary embodiment explained in the foregoing. It is therein a particular characteristic feature of both last-cited exemplary embodiments that the active components are implemented redundantly.

Figure 4:
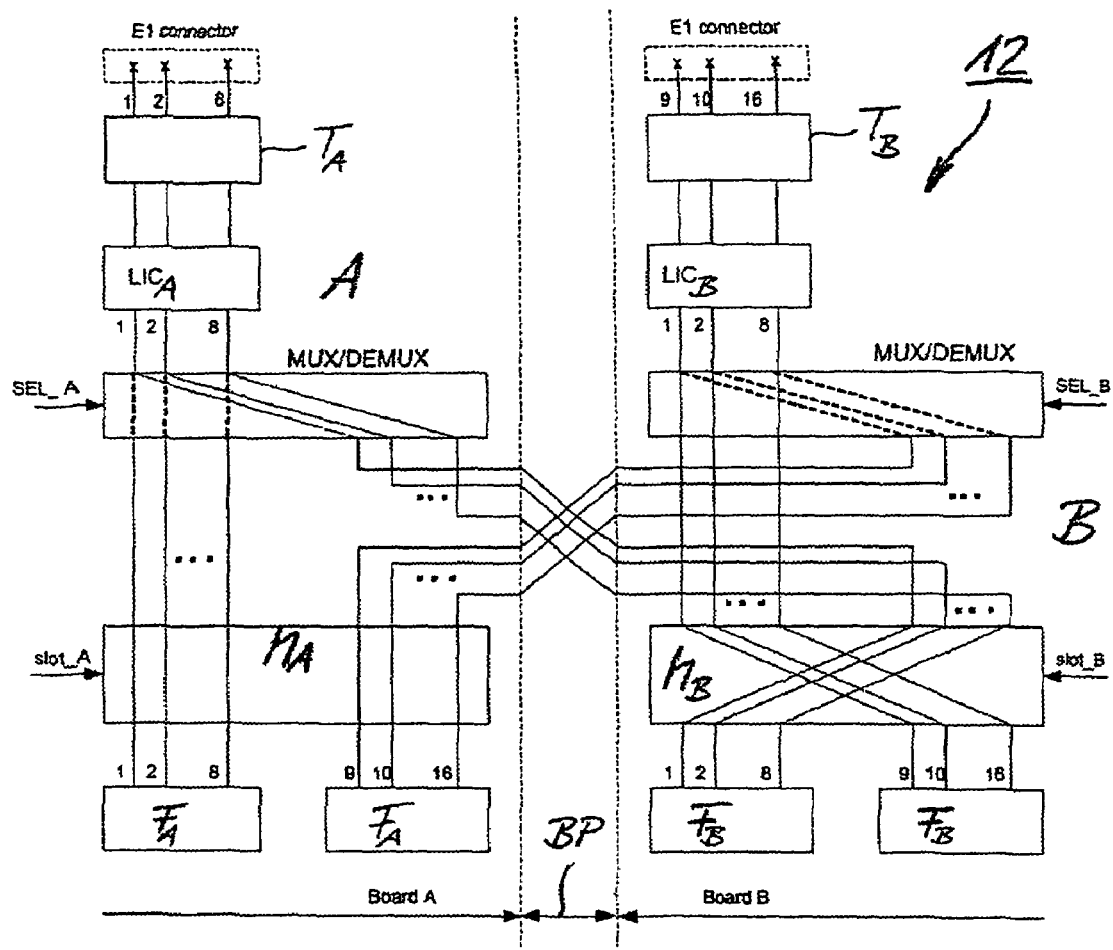
FIG. 4 shows a third inventive processing device with changing over of the E1 interfaces by means of an internal MUX/DEMUX.

A third data-transmission device 12 according to FIG. 4 is fashioned as an exemplary embodiment wherein the switching function controlled by the signal SEL_A, SEL_B is performed between the line modules LIC and the multiplexers M. The E1 lines are again divided as in the two preceding exemplary embodiments. The complete interfaces (transformer T and line module LIC) implemented in keeping with G.703 are here not assigned directly to the plug-in connector. In each case one digital changeover switch MUX/DEMUX controlled by the signal SEL_A, or, as the case may be, SEL_B is arranged on the internal interface of the line module LIC. The E1 lines are further connected when the active condition has been assigned to one of the two modules A or B. The function of the downstream multiplexer M again corresponds to that of the two preceding exemplary embodiments.

The particular advantage of said third data-transmission device 12 is the particularly low expenditure required for its implementation. For example, the static multiplexer M and the controlled changeover switch MUX/DEMUX can be implemented together in an FPGA. The internal interface between said two components is therein independent of the line interface and so can be freely dimensioned. It can in the simplest case consist of CMOS lines.

Figure 5:
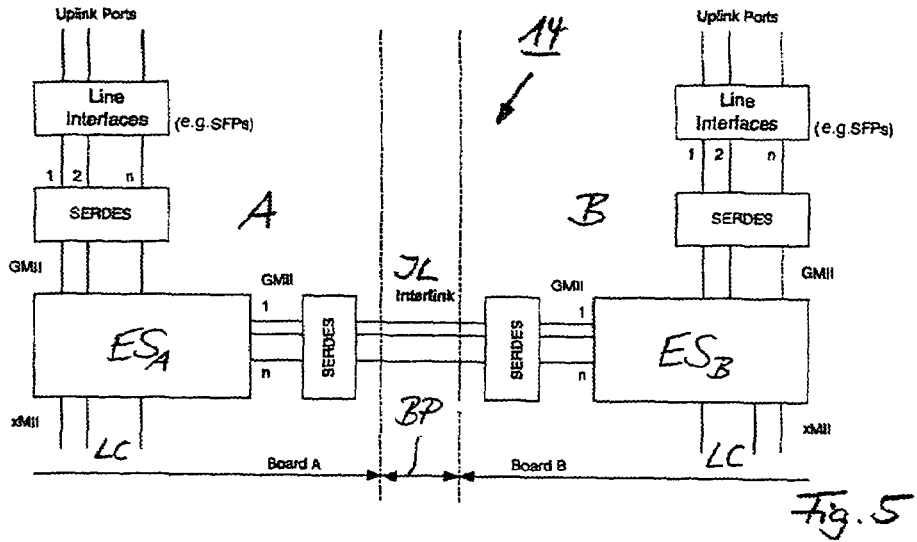
FIG. 5 shows a processing device having redundancy changeover by means of an interlink between two Ethernet switches according to the prior art.

FIG. 5 shows a prior-art transmission device 14, comparable to the embodiment according to FIG. 1, for Ethernet uplink interfaces (ports). The uplink interfaces of both central modules A and B are configured therein as active. The module having the standby status switches the Ethernet frames determined on the uplink completely via the internal interlink connection IL to the active module. The interlink connection IL between the two central modules A and B are usually implemented as standard interfaces (SERDES, GMII, for example), with no additional requirements being placed on the choice of Ethernet switch ES.

The main disadvantage of said transmission device 14 is the complex control of the switched connections, because the two operating modes have to be differentiated. The active module must therein further connect the data traffic waiting at said module's uplink ports and the data traffic determined via the interlink connection IL to the line cards LC. The module having the standby status must nonetheless further connect the data traffic waiting at its uplink ports to the interlink connection IL. An implementation of the Link Aggregation Protocol for uplink ports distributed between both modules A, B cannot be applied because both Ethernet switches ES operate actively. Even a fault in the module having the standby status will thus have direct repercussions on the performance on the uplink interface. Proprietary solutions are furthermore known wherein a proprietary interface having a high bit rate is provided between adjacent Ethernet switches, producing a virtual switch containing a plurality of components. When said components are distributed among a plurality of reciprocally redundant modules, the Link Aggregation Protocol can in the event of a fault be used to split up the data traffic or, as the case may be, split it up differently. The main disadvantage of said arrangement is the use of proprietary interfaces and the limitations in the design of transmission equipment that are associated therewith.

Figure 6:
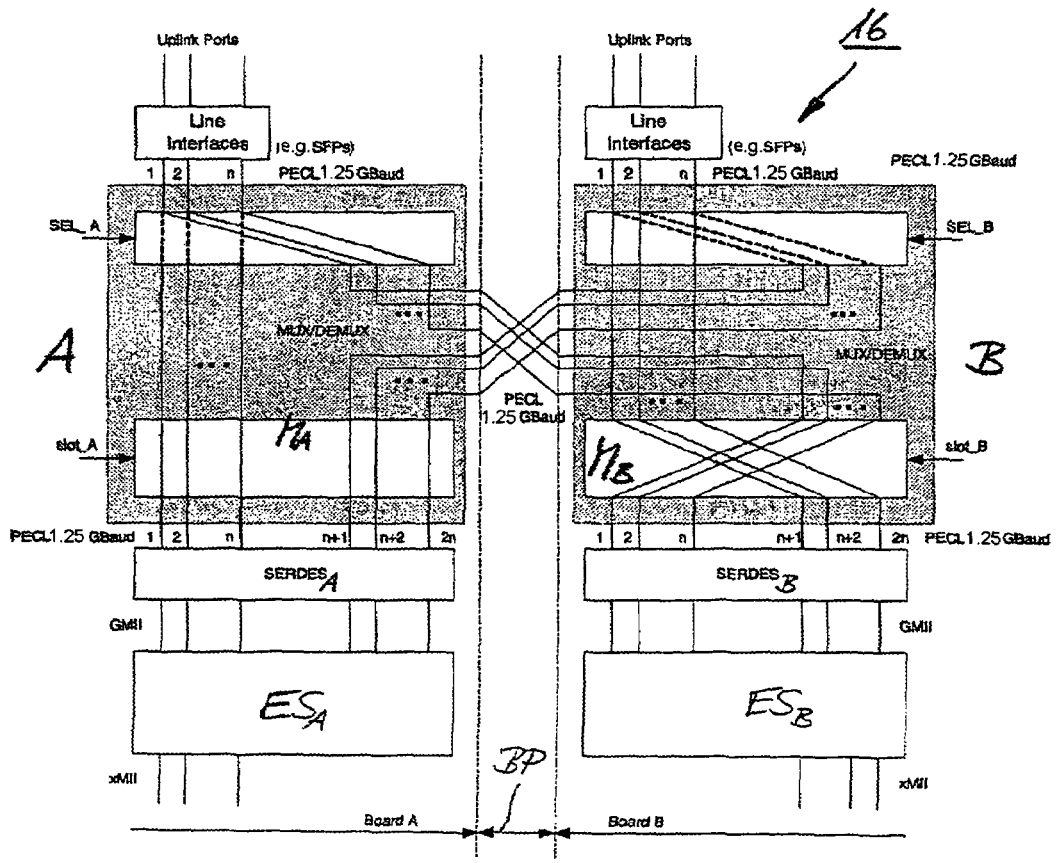
FIG. 6 shows a fourth inventive processing device with changing over of the Ethernet uplink ports by means of an internal MUX/DEMUX.

FIG. 6 also contains a schematic of the solution for a transmission device 16 having a number of 2n Ethernet ports. In common with the approach illustrated in FIG. 4, a statically controlled MUX/DEMUX is here employed on each module A, B. Only one of the two modules operates actively. The uplink interfaces of the two modules are switched to the active module's Ethernet switch ES. Regardless of their position in the shelf, the Ethernet switches ES have the same assignment scheme. Simple updating of the datasets on the standby module (mirroring of the active module's datasets), and hence simple changeover from the standby to the active status, is enabled thereby. The Link Aggregation Protocol can be used for all uplink interfaces (n on the active and n on the standby module), as a result of which there is no need for proprietary interfaces between the two Ethernet switches ES. A high degree of availability thus results from total decoupling of the uplink structure from the standby module's Ethernet switch ES. In this way, faults and/or upgrade processes in this circuit domain will not affect the modules' other traffic behavior.

A statically controlled MUX/DEMUX is arranged in the transmission device 16 between the uplink interfaces (for example an SFP module with an optical interface) and the respectively assigned SERDES. Said MUX/DEMUX consists of a statically controlled changeover switch which, by means of logical control signals SEL_A or, as the case may be, SEL_B, determines which of the two modules operates in the active and in the standby mode, and a signal slot_A-, slot_B-controlled multiplexer M which, with identically implemented modules, will insure an identical assignment scheme for the Ethernet switches ES. The connection scheme of the two Ethernet switches ES which is identical and independent of the module's mounting location enables simple mirroring of the active Ethernet switch's configuration data to the standby switch.

A particular feature of the MUX/DEMUX employed is its simple structure. The exemplary embodiment shows the inventive arrangement having switched serial data links (PECL 1.25 GBaud) as used as the interface between SERDES and SFP. In a further variant, not shown here, the controlled MUX/DEMUX is implemented using type MII/GMII/xMII data interfaces. The controlled MUX/DEMUX is then arranged directly behind the Ethernet switch ES in said variant. Furthermore, the Ethernet switches ES of both central modules are connected to the non-centralized line cards LC via a double-star structure.

Fast and simple changeover from the active to the standby condition, or vice versa, can in this way also be achieved here by means of a logical control signal and an identical-configuration for the active and standby switch. The necessary functionality of the standby module for using the uplink interfaces located there is also advantageously minimized thereby, which is to say the Ethernet switch ES will in particular not be included, as a result of which there will also be a high degree of availability in the event of a fault. Moreover, the Link Aggregation Protocol can be used for load controlling or, as the case may be, error compensating when there are a plurality of uplink interfaces, with special proprietary solutions being avoided.

The invention claimed is:
1. A data-transmission device having a number of N uplink interfaces routable to an output element over a processing line provided with data-processing components, comprising:
   a first processing line and a second processing line, each having two separate processing rows for in each case

N/2 data lines, with a first half of the N uplink interfaces being connected to the first processing line and a second half of the N uplink interfaces being connected to the second processing line, and with each processing line having a circuit arrangement by means of which the N/2 data lines connected to the processing line are connectable to the respective other processing line to one of the two processing rows available there, and with the circuit arrangements being controlled in such a way that one of the two processing lines is active and the respective other can be switched to a standby mode so that the data traffic waiting at the N uplink interfaces can be handled via one of the two processing lines;

wherein a line crossover arising through transferring of the N/2 data lines can be canceled by means of a static multiplexer as a circuit arrangement;

wherein N>4 and N is an even number;

wherein the multiplexer is controlled by a slot that is derived statically from a mounting location of a board containing whichever one of the first processing line and the second processing line is active; and wherein at least one of the first processing line and the second processing line includes a line module with internal terminations that are switched either directly or crossed over to downstream framers in which signal processing takes place.

2. The data-transmission device of claim 1, wherein the uplink interfaces are selected from the group consisting of E1 interfaces, DS1 interfaces, and Ethernet interfaces.

3. The data-transmission device of claim 1, wherein the two processing lines are arranged on, in each case, one module shelf.

4. The data-transmission device of claim 1, wherein the circuit arrangements are arranged in front of the data-processing components arranged in the processing line.

5. The data-transmission device claim 1, wherein the data-processing components arranged in a processing line are subdivided into a number of sub-groups, with the circuit arrangements being arranged between two sub-groups.

6. The data-transmission device of claim 1, wherein the output element is one of an Ethernet switch and a framer.

7. The data-transmission device of claim 1, wherein viewed in an uplink direction, the data-processing components comprise, in sequence, a receive circuit, containing a transformer and a line module, and a multiplexer.

8. The data-transmission device of claim 7, wherein the circuit arrangement between the transformer and the line module is implemented by means of tri-state conditions at an output of the line module.

9. A method for transmitting data traffic that is routed from a number of N uplink interfaces to an output element over a processing line provided with data-processing components, wherein a first processing line and a second processing line are used each having two separate processing rows for in each case N/2 data lines, with a first half of the N uplink interfaces being connected to the first processing line and a second half of the N uplink interfaces being connected to the second processing line, and with the N/2 data lines connected to the processing line being connected by means of a circuit arrangement provided for each processing line to the respective other processing line to one of the two processing rows available there, and with the circuit arrangements being controlled in such a way that one of the two processing lines is active and the respective other has been switched to a standby mode so that the data traffic waiting at the N uplink interfaces will be handled via one of the two processing lines;

wherein a line crossover arising through transferring of the N/2 data lines can be canceled by means of a static multiplexer as a circuit arrangement;

wherein N>4 and N is an even number;

wherein the multiplexer is controlled by a slot that is derived statically from a mounting location of a board containing whichever one of the first processing line and the second processing line is active; and wherein at least one of the first processing line and the second processing line includes a line module with internal terminations that are switched either directly or crossed over to downstream framers in which signal processing takes place.

* * * * *